UNITED STATES PATENT OFFICE.

JOSHUA HUDSON WILLIAMS, OF GREENVILLE, SOUTH CAROLINA, ASSIGNOR TO WILLIAMS COMPANY, OF GREENVILLE, SOUTH CAROLINA, A CORPORATION OF SOUTH CAROLINA.

FOOD PRODUCT MANUFACTURED FROM POTATOES OR YAMS AND THE PROCESS FOR PRODUCING SAME.

1,238,371.   Specification of Letters Patent.   Patented Aug. 28, 1917.

No Drawing.   Application filed September 28, 1916.   Serial No. 122,633.

*To all whom it may concern:*

Be it known that I, JOSHUA HUDSON WILLIAMS, a citizen of the United States, residing at Greenville, in the county of Greenville and State of South Carolina, have invented a new and useful Food Product Manufactured from Potatoes or Yams and the Process for Producing Same, of which the following is a specification.

The object of my invention is to provide an improved process of manufacturing foods from yams or potatoes.

In carrying out my process I place a suitable quantity of yams or potatoes in a suitable container having a suitable perforated steel or wire shelf spaced from the bottom. This container is preferably a wooden or steel cylinder and the shelf is positioned about six inches from the bottom. A cover is fastened tightly over the top of the container. The first step of my process is to apply a limited jet of steam to the yams or potatoes, causing a gentle sweat to take place. A part of the water contained in the yams or potatoes is evaporated through the skin in consequence. Nothing of food value is lost. But care must be taken not to apply too much steam at this stage of the process, as it would cause the yams or potatoes to heat too quickly, thus opening the pores of the potatoes and allowing valuable food elements to escape with the water. After a sufficient amount of water has been evaporated a full jet of steam is turned into the container which quickly cooks the potatoes or yams thoroughly, converting the starch elements into a sugary substance known as maltose, which is very desirable. This mass is then allowed to cool and the yams are then peeled. The mass is then placed in a mechanical mixer and mixed thoroughly. I then add an amount of flour sufficient to make a good dough, also salt and flavor, if flavoring is desired. The amount of flour added depends upon the fiber contained in the yams and also upon the moisture they contain, which varies at different seasons of the year. To this thoroughly mixed mass I then add yeast and allow the dough to ferment for a considerable period. During this time it is knocked down several times, the object being for the yeast to break up a large part of the gluten cells contained in the mass. When the mass is fermented to the right stage this sponge or dough will be in a fallen, broken down condition, flabby and slightly sour; in other words, a worked sponge. The process followed in the above described step is similar to the sponge method of making bread. To this sponge is then added a large amount of yams or potatoes which have been thoroughly cooked in the manner described above. The whole amount is remixed thoroughly and put in troughs to rise. There is enough life left in the yeast to bring the complete mass to a full rise. The mass is then made into loaves and baked for several hours. The loaves are taken from the oven and allowed to cool for a considerable period. They are then sliced and the slices are run through a pug mill, which gently pugs the pores of the sliced loaves together. The resultant pugged mass is then dried slightly, run through a suitable mill, and the product of this step in the process is then worked over into a suitable form for marketing. I prefer to market the product in its granulated or nut-like form as it is turned out on being run through a suitable mill.

What I claim is:

1. The process of manufacturing a food from potatoes consisting in steaming the potatoes at first slowly and later more rapidly, cooling them, peeling, mixing, adding flour, salt and flavor as required, adding yeast and allowing the dough to ferment for a considerable period, working over the dough, adding more steamed potatoes, remixing, allowing the mass to rise, baking for a considerable period, cooling, slicing the loaves, running the slices through a pug mill, toasting the pugged mass thoroughly, running it through a mill, and crushing it into nut-like particles for marketing.

2. A granulated food product consisting of a large proportion of cooked sweet potatoes mixed and baked with a baked dough, the dough being produced from steamed sweet potatoes, flour and flavoring ingredients, substantially as hereinbefore set forth.

JOSHUA HUDSON WILLIAMS.

Witnesses:
 FRED W. GREENE,
 STEPHEN NETTLES.